United States Patent
Beach et al.

(10) Patent No.: US 12,120,372 B2
(45) Date of Patent: Oct. 15, 2024

(54) METHOD AND ARTIFICIAL INTELLIGENCE SYSTEM FOR DEVELOPING ENHANCED PLANS RELATED TO MESSAGING ACROSS CROSS-SCREEN MEDIA PLATFORMS

(71) Applicant: Cross Screen Media, LLC, Alexandria, VA (US)

(72) Inventors: Michael Beach, Alexandria, VA (US); Peter Sheridan, Alexandria, VA (US); Zhuoqi Du, Bellevue, WA (US)

(73) Assignee: Cross Screen Media, LLC, Alexandria, VA (US)

( * ) Notice: Subject to any disclaimer, the term of this patent is extended or adjusted under 35 U.S.C. 154(b) by 0 days.

(21) Appl. No.: 18/506,019

(22) Filed: Nov. 9, 2023

(65) Prior Publication Data

US 2024/0073466 A1    Feb. 29, 2024

Related U.S. Application Data

(62) Division of application No. 17/723,113, filed on Apr. 18, 2022, now Pat. No. 11,856,156.

(Continued)

(51) Int. Cl.
*H04N 21/234* (2011.01)
*H04N 21/24* (2011.01)
(Continued)

(52) U.S. Cl.
CPC . *H04N 21/25883* (2013.01); *H04N 21/23424* (2013.01); *H04N 21/44224* (2020.08); *H04N 21/812* (2013.01)

(58) Field of Classification Search
None
See application file for complete search history.

(56) References Cited

U.S. PATENT DOCUMENTS 8,782,683 B2    7/2014  Balakrishnan et al.
10,667,020 B2   5/2020  Ray et al.
(Continued)

FOREIGN PATENT DOCUMENTS

WO    WO-2022221775 A1    10/2022

OTHER PUBLICATIONS

International Preliminary Report on Patentability for International Application No. PCT/US2022/025242 dated Oct. 26, 2023, 10 pages.

(Continued)

*Primary Examiner* — Brian T Pendleton
*Assistant Examiner* — Jean D Saint Cyr
(74) *Attorney, Agent, or Firm* — COOLEY LLP

(57) ABSTRACT

A set of criteria for deploying an advertisement campaign to a set of audience members associated with a region are received. An audience propensity dataset associated with media platforms are received. The media platforms can include a first and second set of media platforms. Content output by the first set of media platforms can be monitorable by an organization, and content output by the second set of media platforms is not monitorable by the organization. A pricing dataset indicating pricing information associated with the first set of media platforms at the region is received. A viewing dataset indicating viewing information for the set of audience members using the first set of media platforms is received. A media plan generated based on a predicted viewership dataset, a tier dataset, and a cost dataset.

20 Claims, 12 Drawing Sheets

Related U.S. Application Data

(60) Provisional application No. 63/175,682, filed on Apr. 16, 2021.

(51) Int. Cl.
  *H04N 21/25* (2011.01)
  *H04N 21/2543* (2011.01)
  *H04N 21/258* (2011.01)
  *H04N 21/262* (2011.01)
  *H04N 21/44* (2011.01)
  *H04N 21/442* (2011.01)
  *H04N 21/81* (2011.01)

(56) References Cited

U.S. PATENT DOCUMENTS

| | | |
|---|---|---|
| 10,812,870 B2 | 10/2020 | Ray et al. |
| 11,856,156 B2 | 12/2023 | Beach et al. |
| 2016/0117720 A1 | 4/2016 | Hood et al. |
| 2017/0034592 A1* | 2/2017 | Ray ................... G06Q 30/0275 |
| 2017/0208370 A1* | 7/2017 | Ray ...................... H04N 21/266 |
| 2018/0091850 A1* | 3/2018 | Sandholm ............ H04N 21/252 |
| 2020/0160375 A1* | 5/2020 | Berrett ............... G06Q 30/0244 |
| 2022/0337896 A1 | 10/2022 | Beach et al. |

OTHER PUBLICATIONS

International Search Report and Written Opinion for International Application No. PCT/US2022/025242, mailed Jul. 29, 2022.
Notice of Allowance for U.S. Appl. No. 17/723,113 dated Aug. 10, 2023, 14 pages.
Notice of Allowance for U.S. Appl. No. 17/723,113 dated Nov. 28, 2023, 2 pages.

* cited by examiner

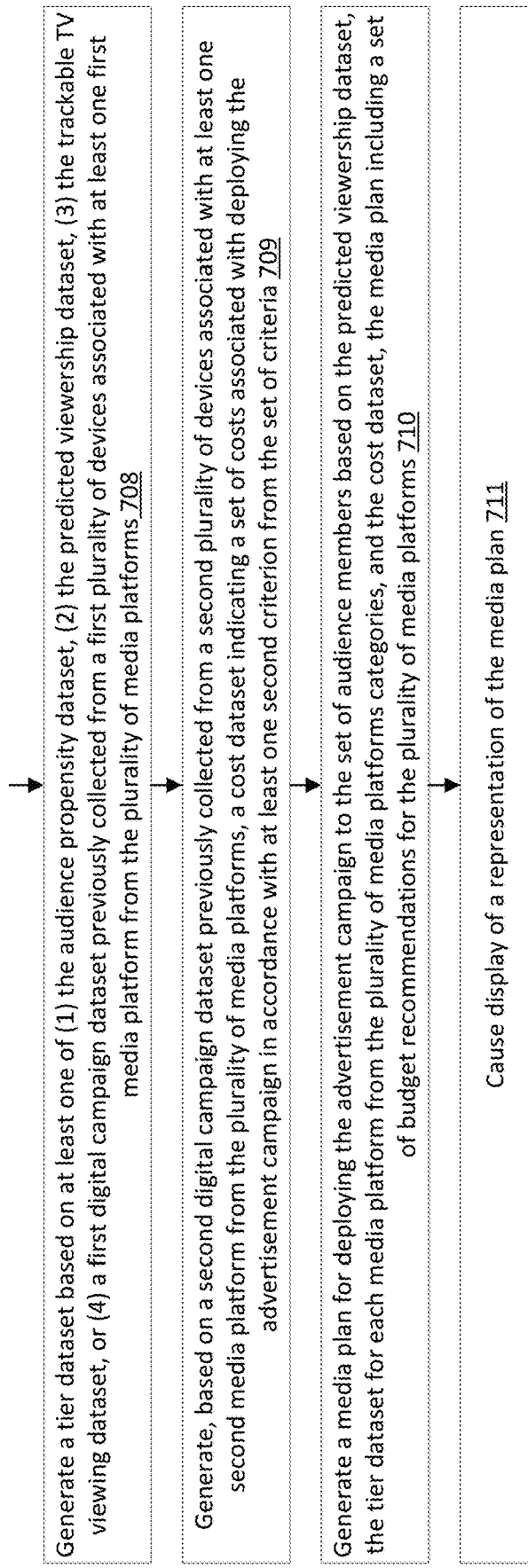

Receive a set of criteria for deploying an advertisement campaign to a set of audience members associated with a region, the set of audience members identified based on at least one first criterion from the set of criteria, and the at least one first criterion including an indication of the region 801

→

Receive an audience propensity dataset associated with a plurality of media platforms, the audience propensity dataset indicating a set of media consumption propensities associated with the set of audience members across the plurality of media platforms, the media platforms including a first set of media platforms and a second set of media platforms different than the first set of media platforms, content output by the first set of media platforms being monitorable by an organization, and content output by the second set of media platforms not being monitorable by the organization 802

→

Receive a pricing dataset indicating pricing information associated with the first set of media platforms at the region 803

→

Receive a viewing dataset indicating viewing information for the set of audience members using the first set of media platforms 804

→

Generate, based on the audience propensity dataset and the pricing dataset, an audience dataset indicating a set of attributes associated with the set of audience members 805

→

Generate, based on the audience propensity dataset and the viewing dataset, and to counter sample bias associated with the viewing dataset, a set of weights 806

→

Continuing at FIG. 8B

Continuing from FIG. 8A

Generate, based on the audience dataset and the set of weights, a predicted viewership dataset indicating predicted media viewership information of the advertisement campaign for the set of audience members 807

Generate a media plan for deploying the advertisement campaign to the set of audience members based on the predicted viewership dataset, a tier dataset indicating a tier of media consumption for each media platform from the set of media platforms for each audience member from the set of audience members, and a cost dataset indicating a set of costs associated with deploying the advertisement campaign in accordance with at least one second criterion from the set of criteria, the media plan including a set of budget recommendations for the plurality of media platforms 808

Cause display of a representation of the media plan 809

Receive a set of criteria for deploying an advertisement campaign to a set of audience members associated with a region, the set of audience members identified based on at least one first criterion from the set of criteria, and the at least one first criterion including an indication of the region 901

Receive an audience propensity dataset associated with a plurality of media platforms, the audience propensity dataset indicating a set of media consumption propensities associated with the set of audience members across the plurality of media platforms, the media platforms including a first set of media platforms and a second set of media platforms, content output by the first set of media platforms being monitorable by an organization, and content output by the second set of media platforms not being monitorable by the organization 902

Receive a pricing dataset indicating pricing information associated with the first set of media platforms at the region 903

Receive a viewing dataset indicating viewing information for the set of audience members using the first set of media platforms 904

Generate a media plan for deploying the advertisement campaign to the set of audience members based on (1) a predicted viewership dataset indicating predicted media viewership information of the advertisement campaign for the set of audience members, (2) a tier dataset indicating, for each media platform from the plurality of media platforms, a tier of media consumption for that media platform for each audience member from the set of audience members, and (3) a cost dataset indicating a set of costs associated with deploying the advertisement campaign in accordance with at least one second criterion from the set of criteria 905

Cause display of a representation of the media plan 906

FIG. 9

METHOD AND ARTIFICIAL INTELLIGENCE SYSTEM FOR DEVELOPING ENHANCED PLANS RELATED TO MESSAGING ACROSS CROSS-SCREEN MEDIA PLATFORMS

CROSS REFERENCE TO RELATED APPLICATION

This application claims priority to and is a divisional of U.S. patent application Ser. No. 17/723,113, filed on Apr. 18, 2022, and titled "METHOD AND ARTIFICIAL INTELLIGENCE SYSTEM FOR DEVELOPING ENHANCED PLANS RELATED TO MESSAGING ACROSS CROSS-SCREEN MEDIA PLATFORMS", which claims priority to and the benefit of U.S. Provisional Patent Application No. 63/175,682, filed Apr. 16, 2021 and titled "METHOD AND ARTIFICIAL INTELLIGENCE SYSTEM FOR DEVELOPING ENHANCED PLANS RELATED TO MESSAGING ACROSS CROSS-SCREEN MEDIA PLATFORMS", the contents of each which are incorporated by reference in its entirety herein.

FIELD

One or more embodiments are related to a method and artificial intelligence system for developing enhanced plans related to messaging across cross-screen media platforms. In some implementations, the artificial intelligence system operates under a degree of uncertainty using datasets representing varying degrees of media consumption properties to develop an enhanced plan that accounts for both media platforms that are trackable and media platforms that are not trackable.

BACKGROUND

For some years consumers had a limited number of available options for accessing video content. Broadcast television and cable television were the primary options. Over the last fifteen to twenty years there has been an increase in the number of media platforms available to consumers for viewing such content. And as the number of platforms has increased, the amount of available video content has grown as well.

Seemingly since the very introduction of video to be consumed over broadcast, television third-parties have provided messaging such as advertisements and announcements, in connection with video content. Businesses developed around the mission of determining the placement of these messages, that is matching them up with specific video content so as to best convey those message to an intended audience in the hopes of maximizing the likelihood of achieving a desired result, such as increasing brand awareness or increasing sales of a given product or service.

As an example, a manufacturer of a given product might desire to raise brand awareness of that product among consumers. The manufacturer might then procure advertising time associated with a specific television broadcast. The pricing for such time might be based on the expected audience size for that broadcast. The manufacturer would be interesting in maximizing the impact of any advertising campaign for a given campaign budget, and would then select the advertising slots that best met that goal among the slots available in the various video content that was being broadcasted.

As data collection about consumers generally, and consumers of various video content specifically, became more sophisticated and granular, additional determinations might be made about the placement of, and the cost for certain messages or advertisements. For example, demographic information of viewers (e.g., gender, age, race, etc.) might be tracked or compiled on a geographical basis. This information would be of interest to some manufacturers/advertisers who wished to target specific consumers or consumer segments.

While these processes became more complex in the broadcast television realm, the level of complexity has increased now that there are additional platforms for consuming video, such as by connected TV, mobile/desktop, and social media platforms. On top of that the differences in those platforms, the differences in the types of video content, and the differences in how that content is consumed have made it exceedingly difficult for third parties or agencies to develop messaging or advertising strategies that achieve anything approaching an optimal impact in a cost effective manner.

It would be advantageous to have a system that would facilitate developing message or ad placement strategies across multiple media platforms, targeting the ads or messages to be associated with certain types of content so as to increase (e.g., maximize) the likelihood of enhancing or increasing certain consumer behavior within certain economic constraints.

One shortcoming of focusing on the device population as the base data set is that there are video sources consumed by devices that cannot be tracked. Whereas mobile devices and desktop devices can be tracked, as can smart TVs or other devices facilitating the provision of digital media (e.g., set-top boxes), there is an entire segment of video content that can be received and consumed without being able to be tracked on the basis of the receiving device, namely over the air through antenna video programming. Video consumed in this manner accounts for a meaningful share of the market, and can be particularly important when one is considering advertising and marketing on a more local or regional basis.

Therefore, it would be beneficial to not only be able to provide a system to assist in assessing advertising placement strategies in real or near real-time, it would be advantageous if such a system could address this shortcoming of existing systems.

SUMMARY

In one or more embodiments, a set of criteria for deploying an advertisement campaign to a set of audience members associated with a region are received. The set of audience members can be identified based on at least one first criterion from the set of criteria, where the at least one first criterion includes an indication of the region. Additionally, an audience propensity dataset associated with a plurality of media platforms is received. The audience propensity dataset can indicate a set of media consumption propensities associated with the set of audience members across the plurality of media platforms. The plurality of media platforms can include an over-the-air broadcast TV media platform and a trackable TV media platform. Additionally, a pricing dataset indicating pricing information associated with the over-the-air broadcast TV media platform at the region is received. Additionally, a trackable TV viewing dataset indicating viewing information for the set of audience members using the trackable TV media platform is received. Additionally, an audience dataset indicating a set of attributes associated with the set of audience members is generated based on the audience propensity dataset and the pricing dataset. Additionally, a set of weights are generated to counter sample bias associated with the trackable TV viewing dataset based on the audience propensity dataset and the trackable TV viewing dataset. Additionally, a predicted viewership dataset indicating predicted media viewership information of the advertisement campaign for the set of audience members is generated based on the audience dataset and the set of weights. Additionally, a tier dataset is generated based on at least one of (1) the audience propensity dataset, (2) the predicted viewership dataset, (3) the trackable TV viewing dataset, or (4) a first digital campaign dataset previously collected from a first plurality of devices associated with at least one first media platform from the plurality of media platforms. For each media platform from the plurality of media platforms, the tier dataset can indicate a tier of media consumption for that media platform for each audience member from the set of audience members. Additionally, a cost dataset indicating a set of costs associated with deploying the advertisement campaign in accordance with at least one second criterion from the set of criteria can be generated based on a second digital campaign dataset previously collected from a second plurality of devices associated with at least one second media platform from the plurality of media platforms. Additionally, a media plan for deploying the advertisement campaign to the set of audience members can be generated based on the predicted viewership dataset, the tier dataset for each media platform from the plurality of media platforms categories, and the cost dataset, the media plan including a set of budget recommendations for the plurality of media platforms. Additionally, a representation of the media plan can be caused to be displayed.

In one or more embodiments, a set of criteria for deploying an advertisement campaign to a set of audience members associated with a region are received. The set of audience members can be identified based on at least one first criterion from the set of criteria. The at least one first criterion can include an indication of the region. Additionally, an audience propensity dataset associated with a plurality of media platforms are received. The audience propensity dataset can indicate a set of media consumption propensities associated with the set of audience members across the plurality of media platforms. The media platforms can include a first set of media platforms and a second set of media platforms different than the first set of media platforms. Content output by the first set of media platforms can be monitorable by an organization, and content output by the second set of media platforms is not monitorable by the organization. Additionally, a pricing dataset indicating pricing information associated with the first set of media platforms at the region is received. Additionally, a viewing dataset indicating viewing information for the set of audience members using the first set of media platform is received. Additionally, an audience dataset indicating a set of attributes associated with the set of audience members is generated based on the audience propensity dataset and the pricing dataset. Additionally, a set of weights are generated based on the audience propensity dataset and the viewing dataset to counter sample bias associated with the viewing dataset. Additionally, a predicted viewership dataset indicating predicted media viewership information of the advertisement campaign for the set of audience members is generated based on the audience dataset and the set of weights. Additionally, a media plan for deploying the advertisement campaign to the set of audience members is generated based on the predicted viewership dataset, a tier dataset indicating a tier of media consumption for each media platform from the set of media platforms for each audience member from the set of audience members, and a cost dataset indicating a set of costs associated with deploying the advertisement campaign in accordance with at least one second criterion from the set of criteria. The media plan can include a set of budget recommendations for the plurality of media platforms. Additionally, a representation of the media plan is caused to be displayed.

In one or more embodiments, a set of criteria for deploying an advertisement campaign to a set of audience members associated with a region are received. The set of audience members can be identified based on at least one first criterion from the set of criteria. The at least one first criterion can include an indication of the region. Additionally, an audience propensity dataset associated with a plurality of media platforms are received. The audience propensity dataset can indicate a set of media consumption propensities associated with the set of audience members across the plurality of media platforms. The media platforms can include a first set of media platforms and a second set of media platforms. Content output by the first set of media platforms can be monitorable by an organization, and content output by the second set of media platforms can be not monitorable by the organization. Additionally, a pricing dataset indicating pricing information associated with the first set of media platforms at the region is received. Additionally, a viewing dataset indicating viewing information for the set of audience members using the first set of media platforms is received. Additionally, a media plan for deploying the advertisement campaign to the set of audience members is generated based on (1) a predicted viewership dataset indicating predicted media viewership information of the advertisement campaign for the set of audience members, (2) a tier dataset indicating, for each media platform from the plurality of media platforms, a tier of media consumption for that media platform for each audience member from the set of audience members, and (3) a cost dataset indicating a set of costs associated with deploying the advertisement campaign in accordance with at least one second criterion from the set of criteria. The media plan can include a set of budget recommendations for the plurality of media platforms. The predicted viewership dataset can be generated based on (a) an audience dataset indicating a set of attributes associated with the set of audience members and generated based on the audience propensity dataset and the pricing dataset, and/or (b) a set of weights generated based on the audience propensity dataset and the viewing dataset. The tier dataset can be generated based on at least one of the audience propensity dataset, the predicted viewership dataset, the viewing dataset, or a first digital campaign dataset previously collected from a first plurality of devices associated with at least one first media platform from the plurality of media platforms. The cost dataset can be generated based on a second digital campaign dataset previously collected from a second plurality of devices associated with at least one second media platform from the plurality of media platforms. Additionally, a representation of the media plan is caused to be displayed.

BRIEF DESCRIPTION OF THE DRAWINGS

FIGS. 7A-7B show a flowchart of a method for generating and causing display of a media plan, according to an embodiment.

FIGS. 8A-8B show a flowchart of a method for generating and causing display of a media plan, according to an embodiment.

FIG. 9 shows a flowchart of a method for generating and causing display of a media plan, according to an embodiment.

DETAILED DESCRIPTION

Figure 1:
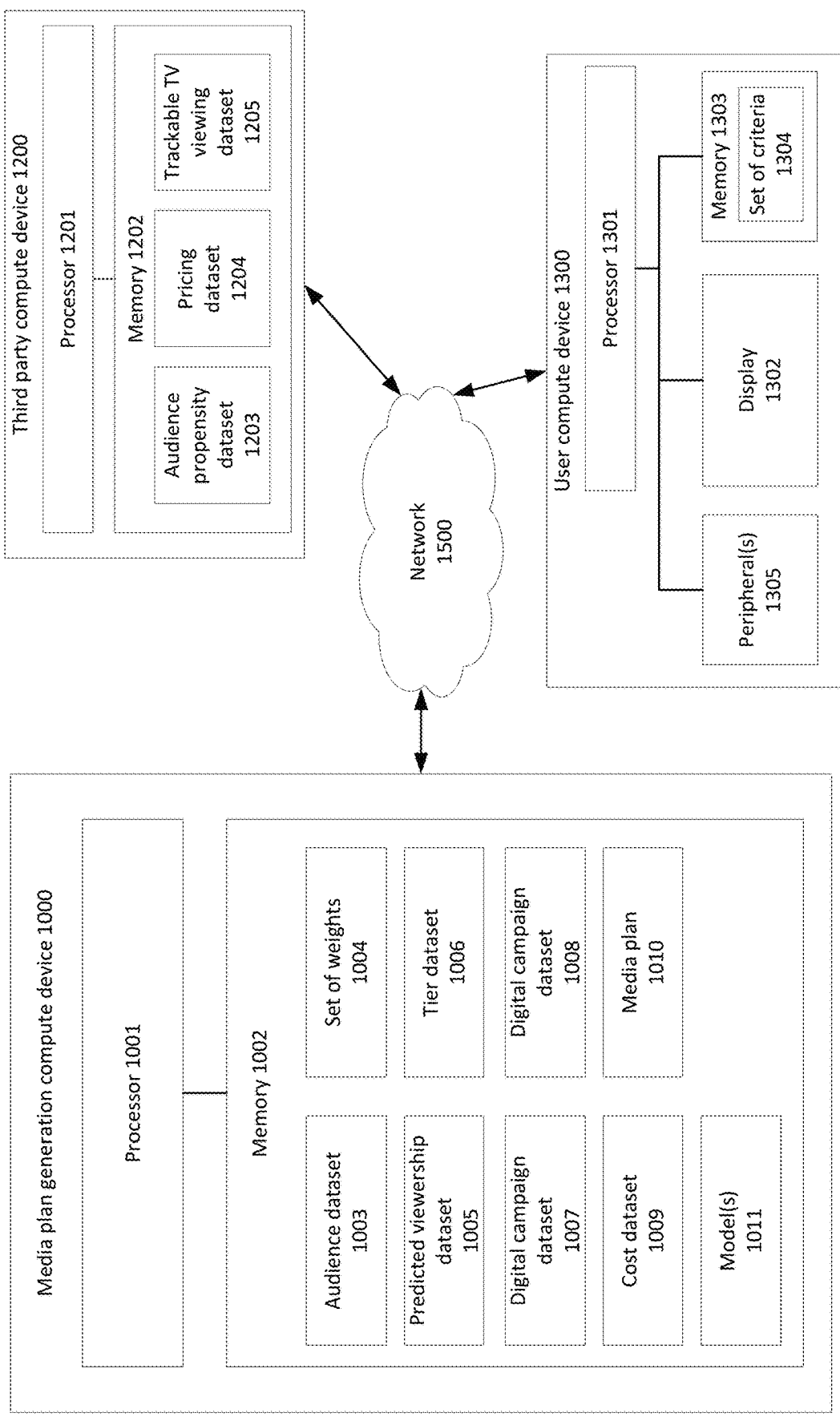
FIG. 1 shows a block diagram of a system for generating and displaying a media plan for deploying an advertisement campaign, according to an embodiment.

In accordance with one or more embodiments, a system builds potential models for placement of messages or advertisements across one or more media platforms considering factors such as the datasets describing media consumption, set-top box data, and/or other sources of audience data (e.g., consumer attributes). In some implementations, data is collected regarding the people consuming content rather than strictly on or about the trackable devices on which users can and do consume data. The data can include media consumption properties covering a wide variety of channels, along with audience attributes, to create a modeled set of audience properties across a given population of consumers of video content. Television viewership data can also be processed, such as might be obtained from sources such as set-top box data. This data can be used to generate cluster ratings. Consumption and reach models can also be generated that account for and/or use data about digital campaigns collected at a device level. An evolutionary algorithm can process this data, along with price and inventory data for purchasing advertising on various media, by running multiple simulations of how a given budget might be utilized or distributed across the media and assessing the likely reach to be obtained by each simulation. The number of simulations can be limited based on a prescribed real-time approximating response time to a user seeking an optimized media plan. The evolutionary algorithm can operate in an interactive fashion such that the user, in an interactive fashion is able to assess multiple possible combinations of media buys as to the desired reach and frequency of the advertising campaign in question.

In some implementations, media plans can be generated that account for media platforms whose displayed content is not always trackable. Said similarly, the content displayed by some media platforms whose displayed content is not always trackable (e.g., over-the-air broadcast TV), and attributes associated with the display of the content (e.g., when the content was displayed, how many times the content was displayed, etc.), can be considered when a media plan is generated. Thus, media plans can be generated that account for media platforms whose displayed content is trackable and whose displayed content is not trackable. As such, media plans can be generated that are more accurate and/or provide more insight than known methods.

Some techniques described herein can allow a compute device to generate media plans faster and/or more efficiently than known methods. Rather than, for example, evaluating a large number of hypothetical media plans before finding a desirable media plan (e.g., a media plan that is in accordance with a set of criteria for deploying an advertisement campaign), an initial media plan (e.g., a single media plan) can be generated. Thereafter, modifications can be made to the initial media plan until a desirable media plan has been created. Such techniques can be much faster and/or efficiently compared to known methods. As such, a functioning of a compute device implementing one or more techniques described herein can be improved (e.g., generate media plans faster, generate media plans with less computing resources, use less memory (e.g., because a large number of hypothetical media plans need not be stored), etc.).

For purposes of description, a number of terms used in the media advertising arena are discussed below.

"Cross-screen" can refer to the distribution of media across multiple delivery platforms and devices that might be accessed and/or used by a given consumer, such as a mobile device like a smartphone or laptop or tablet, a desk top computer, a smart TV or over the air through antenna distribution. For a given cross-screen advertising campaign, one or more embodiments consider how and how many times (frequency) a given ad might be presented to or be displayed to a user across all of the devices or platforms attributable to that user.

"Lift" can refer to brand awareness and can be a measure with respect to a desired increase of a behavior(s) of interest.

"Reach" can be associated with the total number of different people or groups of people (e.g., households) exposed, a minimum number of times (e.g., at least once), to a given advertisement.

An "impression" can refer to an instance in which an advertisement is played, no matter if the advertisement was viewed or not. A constraint might be layered on to whether a given presentation of an ad counts as having been viewed. For instance, for an ad on a digital platform, the ad might only be considered content that has been viewed if it was viewed or viewable for some predetermined time threshold, for example five seconds. This yields a metric referred to as "viewability percentage". The viewability percentage can correspond to the ratio of the number of views to the total number of impressions.

"Gross Rating Points" (GRP) can refer to a measure related to the total audience exposure to advertising messages. As an example, one GRP can be equivalent to the number of views, where on average, 1% of a total audience has seen an ad one time. "Targeted Rating Points" (TRP) on the other hand focuses on the targeted audience. As an example, one TRP can be equivalent to the number of views where on average, 1% of the target audience has seen an ad one time.

FIG. 1 shows a block diagram of a system for generating and displaying a media plan for deploying an advertisement campaign, according to an embodiment. FIG. 1 includes a media plan generation compute device 1000, third party compute device 1200, and user compute device 1300, each operatively coupled to one another via a network 1500.

The network 1500 can be any suitable communications network for transferring data, operating over public and/or private networks. For example, the network 1500 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 1500 can be a wireless network such as, for example, a Wi-Fi or wireless local area network ("WLAN"), a wireless wide area network ("WWAN"), and/or a cellular network. In other instances, the network 1500 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS). The communications sent via the network 1500 can be encrypted or unencrypted. In some instances, the communication network 1500 can include multiple networks or subnetworks operatively coupled to one another by, for example, network bridges, routers, switches, gateways and/or the like (not shown).

The user compute device 1300 can be associated with (e.g., owned by, operated by, accessible by, etc.) a user (or group of users). The user compute device 1300 can include a processor 1301, display 1302, memory 1303, and peripheral(s) 1305, each operatively coupled to one another (e.g., via a system bus).

The processor 1301 of the user compute device 1300 can be, for example, a hardware based integrated circuit (IC) or any other suitable processing device configured to run and/or execute a set of instructions or code. For example, the processor 1301 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 1301 can be operatively coupled to the memory 1303 through a system bus (for example, address bus, data bus and/or control bus).

The memory 1303 of the user compute device 1300 can be, for example, a random-access memory (RAM), a memory buffer, a hard drive, a read-only memory (ROM), an erasable programmable read-only memory (EPROM), and/or the like. In some instances, the memory 1303 can store, for example, one or more software programs and/or code that can include instructions to cause the processor 1301 to perform one or more processes, functions, and/or the like. In some embodiments, the memory 1303 can include extendable storage units that can be added and used incrementally. In some implementations, the memory 1303 can be a portable memory (e.g., a flash drive, a portable hard disk, and/or the like) that can be operatively coupled to the processor 1301. In some instances, the memory 1303 can be remotely operatively coupled with a compute device (not shown); for example, a remote database device can serve as a memory and be operatively coupled to the compute device.

The memory 1303 of the user compute device 1300 can include (e.g., store) a set of criteria 1304. The set of criteria 1304 can include one or more criteria that can be used by the media plan generation compute device 1000 when preparing a media plan (e.g., media plan 1010) for deploying an advertisement campaign. Examples of criteria that can be included in the set of criteria 1304 include a region (e.g., a state(s), a county(s), a city(ies), a neighborhood(s), a combination thereof, etc.), a budget for deploying the advertisement campaign, a goal for the media plan, a frequency range indicating the number of times that an advertisement campaign should be shown to a user and/or group of users, a flight (e.g., date range) indicating when the advertisement should be shown, pricing rates (e.g., television rate card, digital rate card), a criteria for an intended audience (e.g., likelihood of wanting to buy a new vehicle, average age, etc.), and/or the like. In some implementations, the set of criteria 1304 can indicate a region, where audience members associated with (e.g., located within) the region can indicate a set of audience members of interest (also referred to herein as a "set of audience members").

The peripheral(s) 1305 can include any type of peripheral, such as an input device, an output device, a mouse, a keyboard, a microphone, a touch screen, a speaker, a scanner, a headset, a printer, a camera, and/or the like. In some instances, a user can use the peripheral(s) 1305 to indicate (e.g., select, provide, etc.) representations of the set of criteria 1304.

Figure 3:
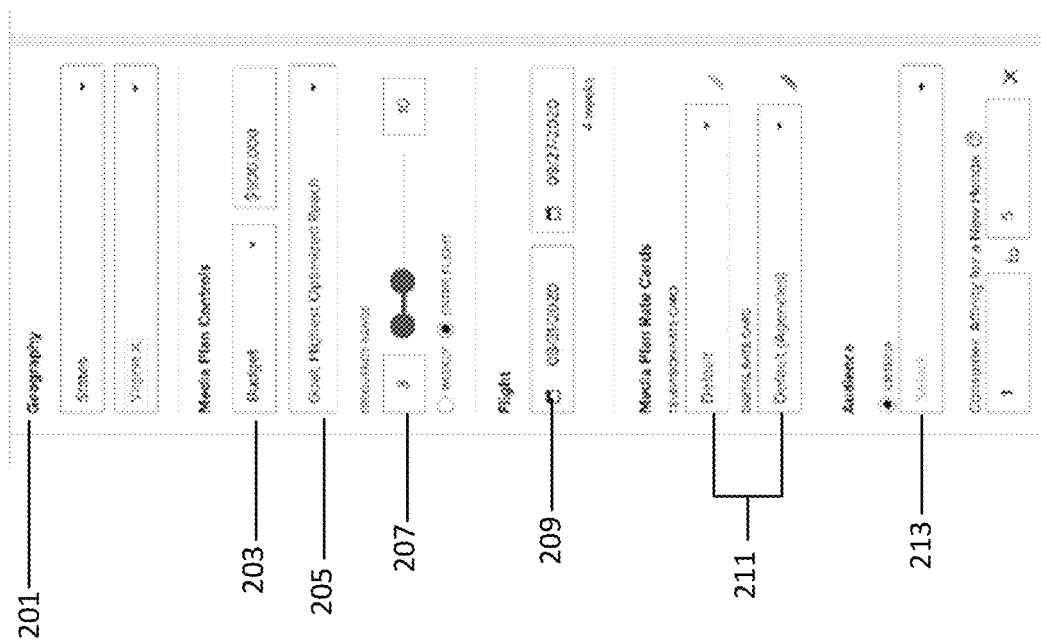
FIG. 3 shows an example of an interactive input screen for receiving/selecting a set of criteria, according to an embodiment.
Figure 4A:
FIGS. 4A-4B show an example of a media plan, according to an embodiment.
Figure 4B:
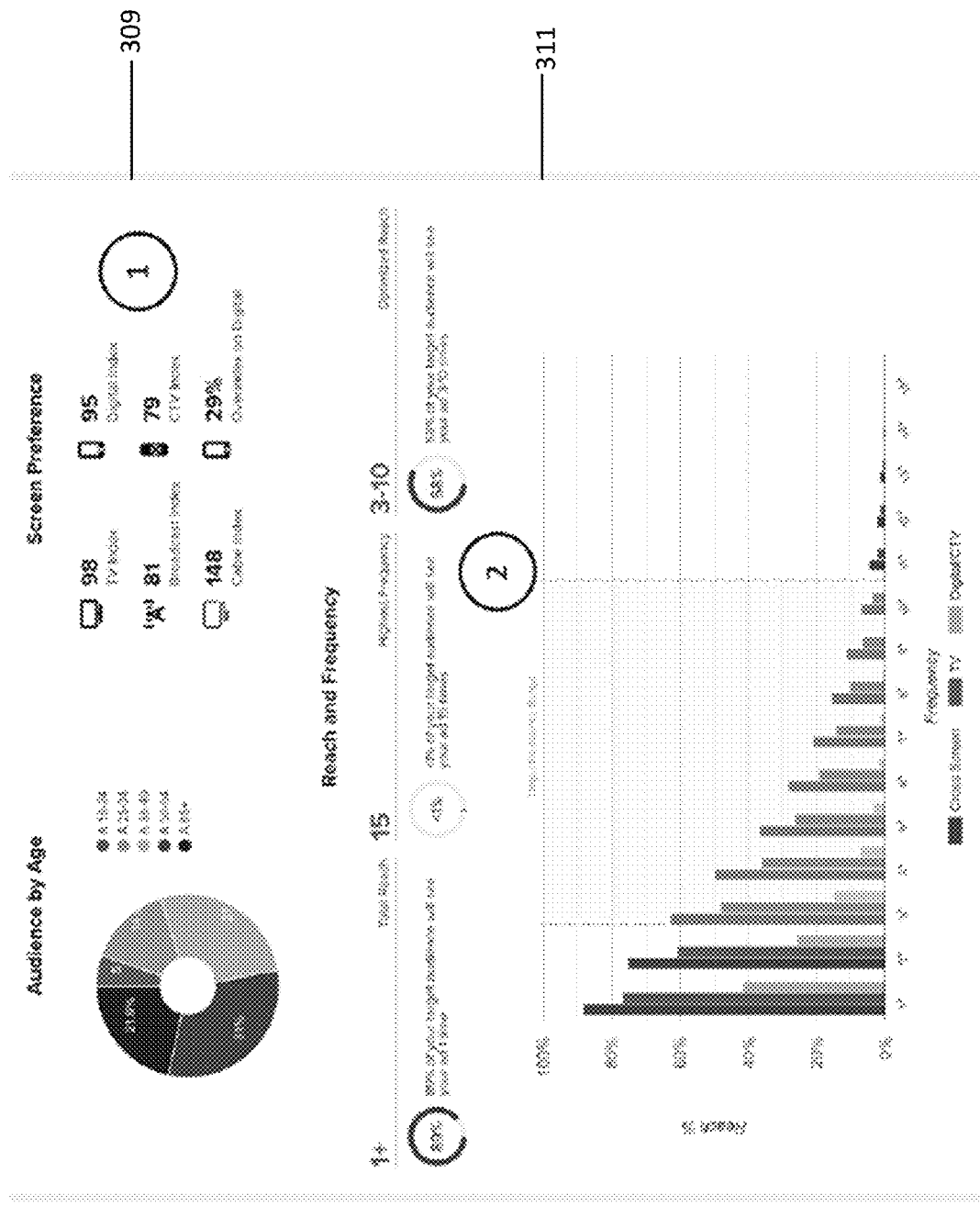

The display 1302 can any type of display, such as a Cathode Ray tube (CRT) display, Liquid Crystal Display (LCD), Liquid Emitting Diode (LED) display, Organic Light Emitting Diode (OLED) display, and/or the like. The display 1302 can be used for visually displaying information to a user. For example, display 1302 can display a screen for the user to provide indications of the set of criteria 1304, an example of which is shown at FIG. 3, and/or a screen for the user to view representations of a media plan (e.g., media plan 1010) generated by the media plan generation compute device 1000, examples of which are shown at FIGS. 4A-4B.

The third party compute device 1200 can be associated with (e.g., owned by, operated by, accessible by, etc.) one or more third parties. The third party compute device 1200 can include a processor 1201 and memory 1202, each operatively coupled to one another (e.g., via a system bus).

The processor 1201 of the third party compute device 1200 can be, for example, a hardware based integrated circuit (IC) or any other suitable processing device configured to run and/or execute a set of instructions or code. For example, the processor 1201 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 1201 can be operatively coupled to the memory 1202 through a system bus (for example, address bus, data bus and/or control bus).

The memory 1203 of the third party compute device 1200 can be, for example, a random-access memory (RAM), a memory buffer, a hard drive, a read-only memory (ROM), an erasable programmable read-only memory (EPROM), and/or the like. In some instances, the memory 1202 can store, for example, one or more software programs and/or code that can include instructions to cause the processor 1201 to perform one or more processes, functions, and/or the like. In some embodiments, the memory 1202 can include extendable storage units that can be added and used incrementally. In some implementations, the memory 1202 can be a portable memory (e.g., a flash drive, a portable hard disk, and/or the like) that can be operatively coupled to the processor 1201. In some instances, the memory 1202 can be remotely operatively coupled with a compute device (not shown); for example, a remote database device can serve as a memory and be operatively coupled to the compute device.

The memory 1202 of the third party compute device 1200 can include (e.g., store) an audience propensity dataset 1203. The audience propensity dataset 1203 can include indications of a set of media consumption propensities associated with multiple audience members, including the set of audience members, across multiple of media platforms. The set of media consumption propensities can include indications of, for example, an age, an income, an urbanicity, presence of children, an education level, a language preference, a political party affiliation, and/or the like for the multiple audience members. In some implementations, the multiple media platforms include an over-the-air broadcast TV media platform, a trackable TV media platform, a cable TV media platform, a mobile/desktop video media platform, a social video media platform, or a combination thereof. In some implementations, the multiple media platforms includes a first set of media platforms and a second set of media platforms different than the first set of media platforms, where content output by the first set of media platforms is monitorable by an organization, but content output by the second set of media platforms is not monitorable by the organization.

The memory 1202 of the third party compute device 1200 can also include (e.g., store) a pricing dataset 1204. The pricing dataset 1204 can include indications of pricing information associated with a set of media platforms (at one or more regions, including a region indicated in the set of criteria 1304 at the user compute device 1300) that output content that is not monitorable. For example, the set of media platform associated with the pricing dataset 120 can include an over-the-air broadcast TV media platform and/or over-the-air cable TV media platform. The pricing information can include indications of, for example, the cost for local advertising spots for over-the-air broadcast TV and/or over-the-air cable TV.

The memory 1202 of the third party compute device 1200 can also include (e.g., store) a trackable TV viewing dataset 1205. The trackable TV viewing dataset 1205 can include indications of viewing information for multiple audience members, including the set of audience members, using a trackable TV media platform, such as a set top box media platform. Examples of viewing information can include, for example, attributes associated with content that was displayed via the trackable TV media platform (e.g., program, date, viewing duration, advertisements displayed, etc.).

The media plan generation compute device 1000 can include a processor 1001 and memory 1002, each operatively coupled to one another (e.g., via a system bus). In some implementations, the media plan generation compute device 1000 is associated with (e.g., owned by, operated by, accessible by, etc.) an organization, user, and/or group of users different than an organization, user and/or group of users associated with the third party compute device 1200 and/or user compute device 1300. The media plan generation compute device 1000 can receive, use, and/or store (e.g., at memory 1002) the audience propensity dataset 1203, pricing dataset 1204, and/or trackable TV viewing dataset 1205 to generate a media plan (e.g., media plan 1010) for deploying an advertisement campaign according to the set of criteria 1304.

The processor 1001 of the media plan generation compute device 1000 can be, for example, a hardware based integrated circuit (IC) or any other suitable processing device configured to run and/or execute a set of instructions or code. For example, the processor 1001 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 1001 can be operatively coupled to the memory 1002 through a system bus (for example, address bus, data bus and/or control bus).

The memory 1002 of the media plan generation compute device 1000 can be, for example, a random-access memory (RAM), a memory buffer, a hard drive, a read-only memory (ROM), an erasable programmable read-only memory (EPROM), and/or the like. In some instances, the memory 1002 can store, for example, one or more software programs and/or code that can include instructions to cause the processor 1001 to perform one or more processes, functions, and/or the like. In some embodiments, the memory 1002 can include extendable storage units that can be added and used incrementally. In some implementations, the memory 1002 can be a portable memory (e.g., a flash drive, a portable hard disk, and/or the like) that can be operatively coupled to the processor 1001. In some instances, the memory 1002 can be remotely operatively coupled with a compute device (not shown); for example, a remote database device can serve as a memory and be operatively coupled to the compute device.

The memory 1020 of the media plan generation compute device 1000 can include (e.g., store) an audience dataset 1003, a set of weights 1004, a predicted viewership dataset 1005, a tier dataset 1006, a digital campaign dataset 1007, a digital campaign dataset 1008, a cost dataset 1009, a media plan 1010, and model(s) 1011.

The model(s) 1011 can be, for example, an artificial intelligence (AI) model, machine learning (ML) model, analytical model, mathematical model, and/or the like. In some implementations, the model(s) 1011 can be used (e.g., by processor 1001) to generate and/or utilize the audience dataset 1003, set of weights 1004, predicted viewership dataset 1005, tier dataset 1006, digital campaign dataset 1007, digital campaign dataset 1008, cost dataset 1009, and/or media plan 1010.

The audience dataset 1003 can include indications of a set of attributes associated with the set of audience members, and can be generated based on the audience propensity dataset 1203 and/or the pricing dataset 1204. Examples of attributes associated with the set of audience members can include information about the age of audience members from the set of audience members (e.g., those older than a given age), interests of the set of audience members, likelihood that an audience member from the set of audience members has a characteristic (e.g., an independent voter, in-market of a consumer item, etc.).

The set of weights 1004 can include indications of one or more weights that can be used to generate predicted media viewership information (e.g., predicted viewership dataset 1005) that has reduced sample bias. The set of weights 1004 can be generated based on the audience propensity dataset 1203 and/or trackable TV viewing dataset 1205. The set of weights 1004 can be associated with a set of various viewer attributes (e.g., age, income, urbanicity, presence of children, education level, language preference, political party affiliation, etc.), and serve to generate predicted viewership information that has reduced sample bias compared to, for example, the audience dataset 1003, audience propensity dataset 1203, and/or trackable TV viewing dataset 1205.

The predicted viewership dataset 1005 can include indications of predicted media viewership information of the advertisement campaign for the set of audience members at one or more media platforms (e.g., over-the-air broadcast TV). The predicted viewership dataset 1005 can be generated based on the audience dataset 1003 and/or the set of weights 1004. The predicted media viewership information can include, for example, representations of predictions on when audience members from the set of audience members will be using a media platform(s) at a time(s) and/or date(s), how many audience members from the set of audience members will be using a media platform(s) at a time(s) and/or date(s), what audience members from the set of audience members will be watching at a time(s) and/or date(s), etc.

The digital campaign dataset 1007 can include indications of impression-level data on digital campaigns, and can be previously collected from one or more devices associated with one or more media platforms (e.g., connected TV). Thus, in some implementations, the digital campaign dataset 1007 can be received from a compute device (e.g., third party compute device 1200 and/or a compute device not shown at FIG. 1). An example of information that the digital campaign dataset 1007 can include is: "device abc1234 who is a member of the "Auto Intender" audience saw ad X on a connected TV device at 9:24 am"; such information can be collected for a multiple devices.

The tier dataset 1006 can include indications of, for each media platform from a plurality of media platforms (e.g., over-the-air broadcast TV media platform, a trackable TV media platform, a cable TV media platform, a mobile/desktop video media platform, a social video media platform), a tier of media consumption (e.g., a value on a scale from 0-10, "none", "light", "heavy", etc.) for each audience member from the set of audience members at that media platform. The tier dataset 1006 can be generated based on at least one of (1) the audience propensity dataset 1203, (2) the predicted viewership dataset 1005, (3) the trackable TV viewing dataset 1205, or (4) the digital campaign dataset 1007.

The digital campaign dataset 1008 can include indications of an aggregate view of the same data where impression-level data is unavailable, and can be previously collected from one or more devices associated with one or more media platforms. The digital campaign dataset 1008 can indicate a higher level, broader view of a dataset, while the digital campaign 1007 can indicate lower level, narrower view of the same dataset. For example, the digital campaign dataset 1008 can indicate that the total number of views an ad had over a given time period.

The cost dataset 1009 can include indications of a set of costs associated with deploying the advertisement campaign in accordance with at least one criterion from the set of criteria 1304, such as a set of costs to deploy the advertisement campaign on a particular date(s), particular time(s), a certain number of times, etc. In some implementations, the set of costs, when summed, is not less than a budget indicated in the set of criteria 1304. The set of costs can include, for example, costs that need to be paid to a media company to air the advertisement campaign. The cost dataset 1009 can be generated based on the digital campaign dataset 1008.

The media plan 1010 can include indications a plan for deploying and/or information about deploying the advertisement campaign to the set of audience members. The media plan 1010 can be generated based on the predicted viewership dataset 1005, the tier dataset 1006, and/or the cost dataset 1009. The media plan can include, for example, indications of a set of cost for each media platform (e.g., a predicted minimum cost, a predicted maximum cost, a predicted actual cost, etc.), reach of the advertisement campaign (e.g., number of different people and/or groups exposed to the advertisement at least once), a delivery estimate of the advertisement campaign, etc. Examples of information that can be displayed at media plan 1010 are shown at FIGS. 4A-4B.

After the media plan 1010 has been generated, one or more signals representing the media plan 1010 can be sent to the user compute device 1300. The user compute device can then display (e.g., automatically and without requiring user input) the media plan 1010 (e.g., to a user) at display 1302 in response to receiving the one or more signals from the media plan generation compute device 1000.

Note that, although FIG. 1 showed the set of criteria 1304, audience propensity dataset 1203, pricing dataset 1204, trackable TV viewing dataset 1205, audience dataset 1003, set of weights 1004, predicted viewership dataset 1005, tier dataset 1006, digital campaign dataset 1007, digital campaign dataset 1008, cost dataset 1009, media plan 1010, and model(s) 1011 stored at memories across three different compute devices, in some implementations, the set of criteria 1304, audience propensity dataset 1203, pricing dataset 1204, trackable TV viewing dataset 1205, audience dataset 1003, set of weights 1004, predicted viewership dataset 1005, tier dataset 1006, digital campaign dataset 1007, digital campaign dataset 1008, cost dataset 1009, media plan 1010, and model(s) 1011 can be stored at memories across less than three different compute devices (e.g., only at media plan generation compute device 1000, or only at media plan generation compute device 1000 and user compute device 1000), or at more than three different compute devices (e.g., at media plan generation compute device 1000, user compute device 1000, third party compute device 1200, and one or more compute devices not shown in FIG. 1).

Note that, although FIG. 1 shows a single media plan 1010 being generated, in some implementations, multiple different media plans can be generated. The multiple different media plans can be generated using different datasets than that used to generated medial plan 1010, or can be generated using the same datasets as those used to generate media plan 1010. In some implementations, multiple different media plans can be generated after generating media plan 1010 using the same datasets as those used to generate media plan 1010, as well as media plan 1010 itself; using media plan 1010 to generate other media plans can allow the other media plans to be generated by media plan generation compute device 1000 quicker than, for example, generating other media plans without using media plan 1010.

Figure 2:
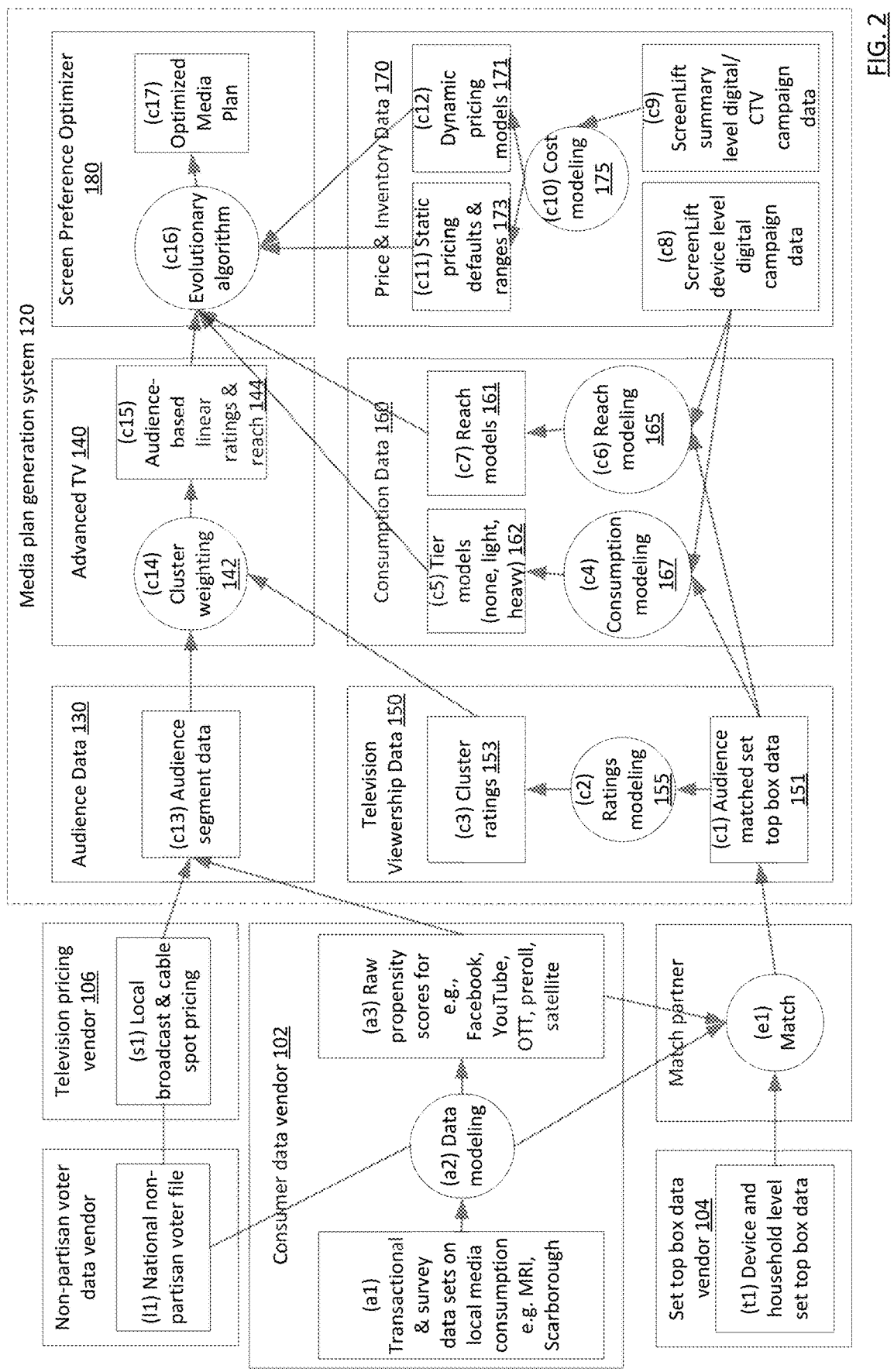
FIG. 2 illustrates a block diagram representation of an arrangement for achieving an enhanced media plan, according to an embodiment.

FIG. 2 illustrates a block diagram representation of an arrangement for achieving an enhanced (e.g., optimized) media plan, according to an embodiment.

The media plan generation system 120 can be associated with (e.g., included in) a media generation compute device (e.g., media generation compute device 1000). For example, circles (e.g., c2, c15, c4, c6, c16, and/or c10) in the media generation system 120 can represent processes that can be performed by a media generation compute device (e.g., by processor 1001 using model(s) 1011), and the squares (e.g., c1, c3, c13, c5, c7, c15, c8, c9, c11, c12, and/or c17) can represent datasets that can be stored in the media generation compute device (e.g., at memory 1002). The media plan generation system 120 can receive audience/viewer related data from a number of third-party sources (e.g., third party compute device 1300 and/or compute devices not shown in FIG. 1) that track audience attributes and media consumption attributes. For example, a first third-party source 102 can provide media consumption propensities (e.g., audience propensity dataset 1203) covering a wide variety of channels, including, but not limited to: broadcast and cable television; satellite television subscriptions; ad-supported OTT; social media usage (e.g., Facebook et al.); and internet video consumption (e.g., YouTube usage). Data source 102 can use these media consumption propensities along with information about audience attributes to create a useful model of audience propensities (e.g., audience dataset 1003)

for a population of media consumers that is inclusive of those consuming video over devices whose display of specific content cannot be detected and/or collected.

Another source of third-party data 104 might supply viewing data available, for instance, from set-top boxes (e.g., trackable TV viewing dataset 1205). This set-top box data can then be correlated with, or matched to other household level audience data. An additional source of third-party data 106 might supply pricing information concerning the cost for local advertising spots for broadcast and or cable media delivery systems of interest (e.g. pricing dataset 1204). This third-party generated data, and optionally other datasets can be used as inputs to the media plan optimizing system 120.

The media plan optimizing system 120 can include a number of data creation modules 130, 140, 150, 160, and 170 which are responsible for generating data to be used by optimizer module 180, which provides as its output enhanced media plan(s) (e.g., media plan 1010) for the user in real or near real-time (e.g., at machine speed) in accordance with specified interaction timing constraints that have an impact on the optimizing process.

A first module 130 generates audience data (e.g., audience dataset 1003) having as its input audience propensity information such as generated by third-party source 102 (e.g., audience propensity dataset 1203) and/or pricing information such as generated by third-party source 106 (e.g., pricing dataset 1204). The generated audience segment data created by module 130 can cover an entire population of users of potential interest, such as, for example all adults within a predetermined region (e.g., the United States, Virginia, New York City, Manhattan, etc.).

The audience segment data generated by module 130 can include data such as information about viewers' ages (e.g., those older than a given age) or viewer interests or the likelihood of the viewer having some characteristic (such as likely to be an independent voter or likely to be an in-market person interested in a particular consumer item, like an in-market car buyer. The output is one of the inputs to Advanced TV module 140.

Another input to module 140 is generated by Television Viewership Data (TVD) module 150. The TVD module 150 can process third-party data such as that provided by third-parties 102 (e.g., audience propensity dataset 1203) and 104 (e.g., trackable TV viewing dataset 1205) described above. TVD module 150 can use household-level set-top box data 151 to generate cluster ratings 153 (e.g., set of weights 1004) that describe or reflect both viewership and pre-calculated reach combinations that will constitute the second input to Advanced TV module 140 to counter sample bias. For example, to counter such bias resulting from television set top box data, television ratings can be computed for a set of clusters (e.g., 1 cluster, 10 clusters, 200 clusters, etc.), based on viewer attributes. Such attributes can include, for example, attributes like age, income, urbanicity, presence of children, education level, language preference, and political party affiliation. These cluster ratings can be weighted based on the makeup of each audience targeted by the system's users or customers of the services available using the system. To use a simplified example, the true composition of likely car buyers in a given state of the United States at a given moment might be such that 50% of those interested are in the ages of 25 to 34 and 50% of those interested are in the ages of 35 to 49. If the set top box data sample available for measurement in this state is such that 40% of the viewers are ages 25 to 34 and 60% are ages 35 to 49, then the age group of 25 to 34 data will be overweighted and the age group of 35 to 49 data will be underweighted to reflect the likely viewership behavior of the target audience.

The TVD module 150 executes a ratings model 155 on the audience-matched set-top box data 151. For ratings model 155 to produce stable ratings from a sample of set-top box data, the modeling can account for sample bias that might be demographic (e.g., cable subscribers skew older and wealthier than the general population) and/or geographic. The cluster ratings 153 can reflect a combination of demographic and viewership-based attributes that can form a foundation for subsequent ratings calculations.

Advanced TV module 140 includes a cluster weighting process 142 that receives the outputs of modules 130 (e.g., audience dataset 1003) and 150 (e.g., set of weights 1004), and generates audience-based linear ratings and reach 144 (e.g., predicted viewership dataset 1005) which predict audience viewership (e.g., of traditional television programming), at any given point in time and/or cumulatively. Weighting process 142 produces the ratings by weighting the selected audience segment data of module 130 with the pre-generated cluster weightings from module 150. The linear ratings and reach data are among the inputs to the optimizer 180.

Additional inputs to optimizer 180 are generated by the Consumption Data module 160 and Price and Inventory Data module 170.

Consumption Data module 160 generates a tier dataset (e.g., tier dataset 1006) that can be used by the optimizer. The tier dataset can include, for example, a model for reach 161 and/or a model for tiers of consumption 162. The model for reach 161 and model for tiers of consumption 162 can be generated by two different modeling processes—a reach modeling process 165 and a consumption modeling process 167, respectively. The consumption modeling process 167 receives as inputs audience-matched set-top box data such as used by ratings model 155, and digital campaign data collected at a device level (e.g., digital campaign dataset 1007). The model 155 can map audience propensities to device level data for digital and television. The attributes can eventually be augmented or replaced over time as more specific individual and household level data became available. The result of the consumption modeling can be a classification of audience targets into one of a number of tiers, such as none, light and heavy groups. These media consumption tiers are an estimate of how views are distributed across all adults. For example, in a first category, "none" the consumption on this screen or platform is negligible or perhaps not even measurable. In a second category, which can be referred to as "heavy," this tier consumes or accounts for a significant percentage of all views on this screen/platform (e.g., 80%, although this number can vary depending on the platform). In a third category, which can be referred to as "light," this tier consumes a measurable, but smaller % of all views on this screen/platform (e.g., 20% which again, can vary depending on the platform). The groups are screen and geography—specific to account for factors such as cable penetration. This tier model data can be provided for each media platform category such as: broadcast TV; cable TV; connected TV (OTT); Mobile/Desktop Video; and social video.

The reach modeling process 165 also uses audience-matched set-top box data and digital campaign data (e.g., digital campaign data 1008) to generate reach models. This process produces the tiers from raw propensity scores & device-level/aggregate campaign data. In some implementations, rather than starting from the bottom up using matched devices, which gives a detailed picture of part of that audience, the media plan generation system 120 starts from the top down, enabling an understanding of the true audience of interest. In some implementations, the media plan generation system 120 can organize media into five categories: Broadcast TV; Cable TV; Desktop/Mobile Video; Social Video; and OTT/CTV. Understanding who the light and heavy consumers of content are, and the difference in view distribution between those two groups, can be useful for understanding how reach models develop across devices. The approach to the display of media consumption analytics and the optimization of media plans can be based on classifying everyone in the audience data set into one of three tiers (e.g., none, light, or heavy) within each of these five categories. The inputs to these media consumption tiers can be, for example, media consumption propensity scores (e.g., such as those sourced from Acxiom®). These propensity scores can derived from a variety of sources and could come, for example, from partnerships with companies like MRI®, Scarborough®, and others, and use a mix of survey-based and transactional sources. The propensity scores can be modeled out to the entire data set by, for example, Acxiom®. The media plan generation system 120 can use these elements in combination with the most granular data available, for example—set top box data for linear TV; device level data where available for digital platforms; and aggregate data where unavailable. In the media plan generation system 120, these tiers can be based on a combination of the propensity scores described above, demographics, and the above viewership data to account for sample bias, OTA viewership, and other factors.

The Price and Inventory Data module 170 supplies remaining inputs to optimizer 180. The module takes summary-level digital and cable television campaign data (e.g., cost dataset 1009) to create dynamic pricing models 171 as well as static pricing defaults and ranges 173.

The static pricing defaults and ranges 173 can represent, for example, minimum/maximum ranges and default prices, viewability rates and five second view rates for all out-of-the box inventory sources. The dynamic pricing models help buyers project the actual cost of programmatic buying given audience size and the incrementally higher costs of buying more views. These outputs can be generated in accordance with a cost-modeling process 175. In the cost-modeling process 175, dynamic pricing models can be produced for media properties for which there is sufficient data using gradient boosting. For these platforms for which data cannot be directly collected the cost modeling process projects viewability rates and five second view rates.

The cost-modeling process 175 can use a variety of input sources on digital and connected TV campaigns, including data received (e.g., purchased) from vendors and/or internally generated data, to reduce (e.g., estimate) the cost of programmatic media buying. Programmatic media buying can sometimes get more expensive as more frequency is purchased, and this effect can be exacerbated by several factors. This data received from vendors and/or internally generated can analyzed by several dimensions, for example: demographics; audience size within each media market; geography; and number of views purchased relative to audience size (aka TRP), and/or the like. Cost data can be modeled, for example, according to the media plan generation system's 120 "common currency", which can be, in one example, a five second, viewable, on target view (and not an impression). This cost is predicted for each block of TRP in eCPM terms.

The optimizer 180 processes the inputs received from modules 140, 160 and 170 in connection with an evolutionary algorithm that provides a system user, who is operating an interactive device (e.g., user compute device 1300), with a media plan (e.g., medial plan 1010) in real or near-real time, that is, operating under a time constraint to provide a sufficiently useful interactive experience. The evolutionary algorithm can be used to simulate multiple (e.g., hundred, thousands, etc.) of potential budget allocations so as to converge on an improved (e.g., near-optimal) solution using, for example, a fitness function that proceeds through multiple iterations bounded by a desired interactive speed (e.g., in thirty seconds or less and much faster than possible by a human). The output is a media plan that can display information such as budget recommendations, estimated TRP at the market level by inventory source, top-line estimates for total and optimized reach, and/or the like.

An example of an interactive input screen is shown in FIG. 3. In some implementations, the interactive input screen is displayed on display 1302 of the user compute device 1300 to receive indications of the set of criteria 1304 from a user of the user compute device 1300. In FIG. 3, inputs include, for example: target geography (201) (e.g., region where a set of audience members of interest are located); budget and/or frequency constraints (203); a goal 205 (e.g., highest optimized reach, where optimized reach is "reach" within a user specified target frequency range); target frequency range (207); desired time period (209); pricing and inventory data (211) (e.g., which can come from cost models or user input); and criteria for an audience segment (213).

Examples of embodiments of output screens are shown in FIGS. 4A and 4B. In some implementations, the output screens are displayed on display 1302 of the user compute device 1300 to visually display the media plan 1010 to a user of the user compute device 1300. Outputs can include, for example: summary of spend allocation (e.g., budget recommendations) after executing optimization (301); summary of optimized/total reach along with modeled unique reach and overlap across linear television and digital/CTV (303); and media market-level spend recommendations and delivery estimates from optimization (305). Other possible displayed outputs include: a summary in aggregate of reach model data translated to indexes where 100=national average consumption (309); and an estimate of reach to target audience at each frequency level for digital/CTV, linear television and combined to assist in understanding characteristics of plan budget allocation (311).

In some cases, optimizing directly towards business outcomes is possible. For some video advertising campaigns, however, reach & frequency are a desirable proxy for an effective media plan. Some implementations use a common currency based on a predetermined time (e.g., 5 second) on-target viewable view, digital pricing models, default and/or user-specified pricing and inventory data, and audience media consumption models, combined with algorithms, to create media plans enhanced for cross screen reach within a target frequency range.

Figure 5:
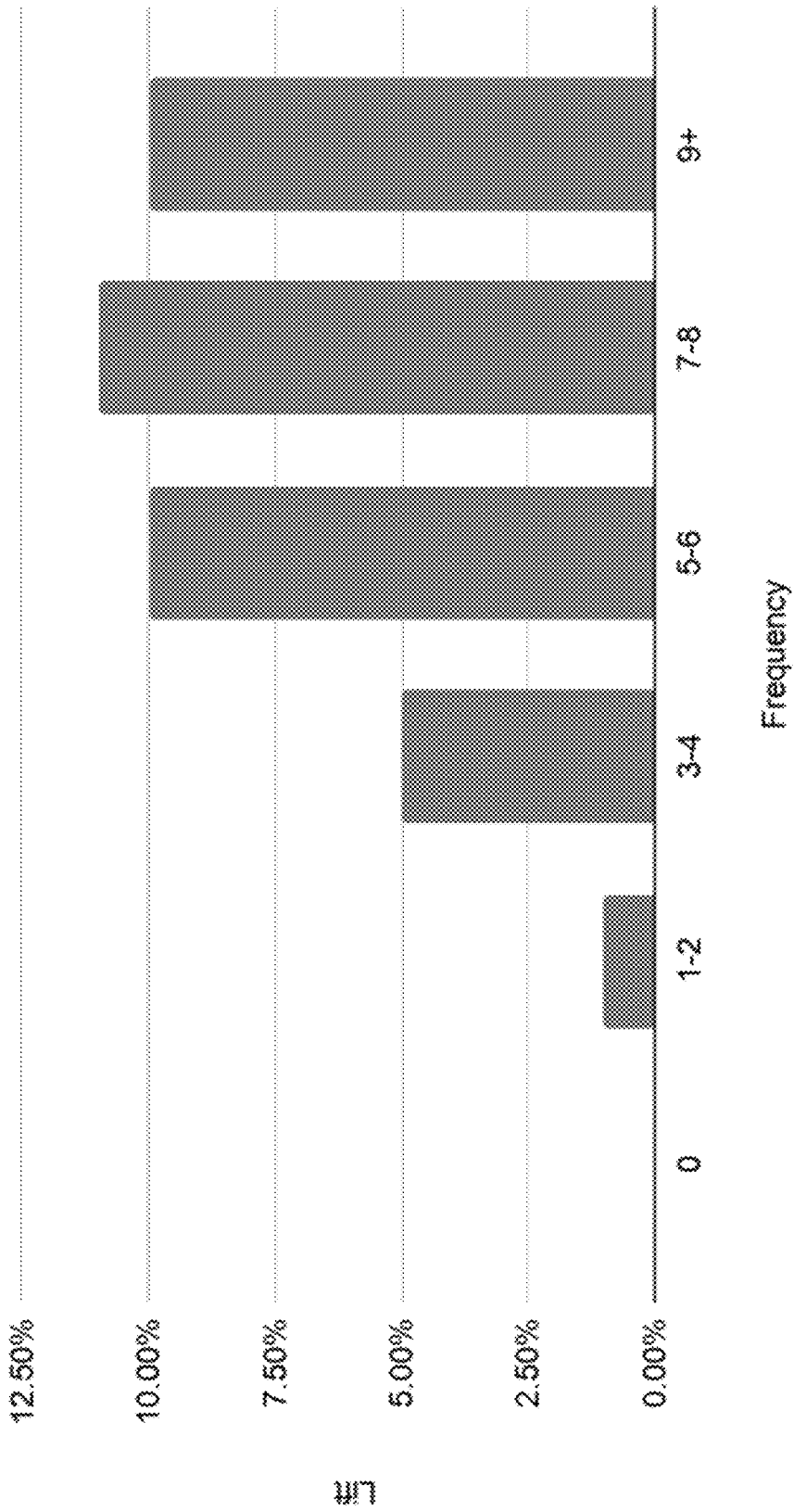
FIG. 5 shows a graph indicating frequency versus lift, as one example.

Research on video advertising and frequency typically shows a significant increase in lift on a desired metric, e.g., brand awareness or purchase intent, at a specific minimum frequency level (e.g., 2 or 3). Lift can continue to increase with frequency to a point, but can eventually plateau and/or decline, indicating a potential negative impact of overexposure. An example of this is shown in FIG. 5, where lift increases with frequency at first, then declines when frequency exceeds a given threshold.

In accordance with an embodiment, a screen preference optimizer (e.g., media plan generation compute device

1000) uses a user-specified constraint (e.g., budget, frequency range) and enhances "reach"—reach within this target frequency range.

Note that, in some implementations, this could mean that a reach-optimized plan will not always produce the highest TRP or view number, or the lowest overall eCPM. Given a target frequency range of 3-9, for example, the screen preference optimizer might recommend buying comparatively expensive broadcast to move a segment of the audience primarily reachable via this channel from a 2 to a 3 frequency instead of buying relatively inexpensive CTV to move the CTV-heavy segment from a 9 to a 10 frequency. In some implementations, the frequency range directly controls the outcome.

Enhancing for increased (e.g., maximum) TRP is also possible. If the input costs are known in terms of $/TRP, and constraints such as maximum budget & equal TRP across media markets are specified, this is effectively a linear optimization problem. Even corner cases, such as limiting one market to digital only and thus exempting the cases from the constraint of balancing TRP across markets, are manageable within this approach. The "maximize TRP" and "minimize budget" goals in an embodiment can follow this approach, where the goals can be used as a point of reference rather than to construct plans intended for execution.

Figure 6:
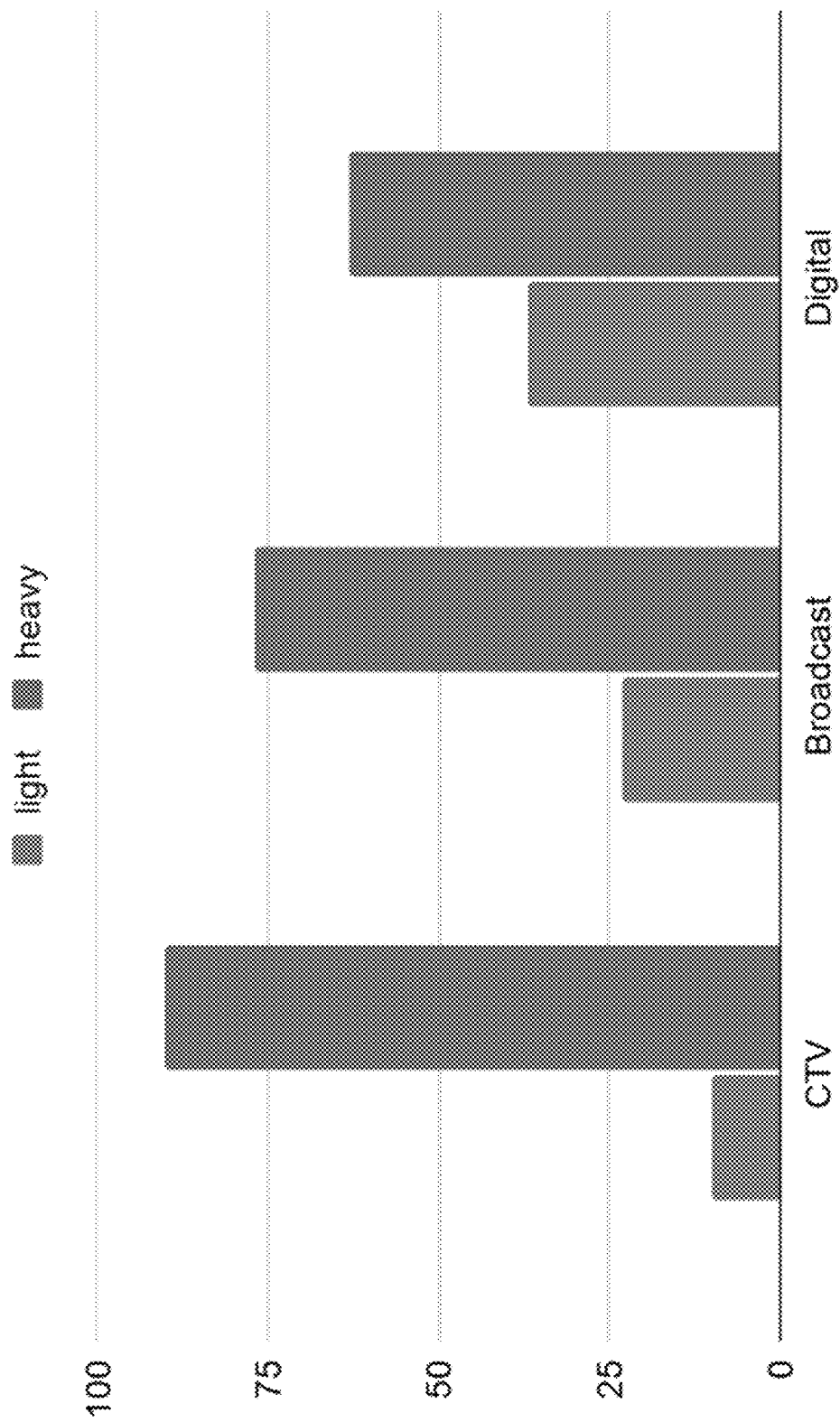
FIG. 6 shows a graph indicating a probability that a set of audience members are light or heavy consumers of content at a connected TV media platform, a broadcast TV media platform, and a digital media platform, as one example.

Enhancing for deduplicated reach across screens is also possible. To estimate reach for a given media plan—a media plan generation system can take into account the following. First, tier models (e.g., tier dataset 1006) are translated into a probability distribution, as shown in FIG. 6. FIG. 6 shows distribution of 100 TRP across a 50/50 light-heavy audience, across three categories (i.e., media platforms). The vertical axis of FIG. 6 represents a probability that the audience is a light or heavy consumer at a category shown at the horizontal axis of FIG. 6.

Then, a sample of the audience is generated, which shows a hypothetical audience sample in a media market.

| Sample | CTV Tier | Digital Tier | Broadcast Tier | Cable Tier |
|---|---|---|---|---|
| 1 | none | light | heavy | light |
| 2 | none | heavy | heavy | heavy |
| 3 | light | light | light | none |
| ... | | | | |
| 998 | none | none | heavy | none |
| 999 | none | light | light | light |
| 1000 | heavy | light | none | none |

With the probability distribution across tiers known, the per-market and per-category TRP are distributed to the sample in the form of views, producing a data set that looks like the following table showing sample frequency distribution.

| Sample | CTV Tier | Digital Tier | Broadcast Tier | Cable Tier |
|---|---|---|---|---|
| 1 | 0 | 1 | 4 | 0 |
| 2 | 0 | 3 | 1 | 0 |
| 3 | 1 | 2 | 1 | 0 |
| ... | | | | |
| 998 | 0 | 0 | 6 | 0 |
| 999 | 0 | 2 | 2 | 1 |
| 1000 | 5 | 1 | 0 | 0 |

This can done over multiple iterations of a Monte Carlo simulation to generate a median optimized reach.

This single media plan estimation approach can be used as a fitness function in an evolutionary algorithm. Using a brute force approach, finding an enhanced (e.g., optimal) budget allocation across even one market might require the evaluation of millions of hypothetical media plans, which could take months of computing time. Instead, the media plan generation system described herein can generate an intelligent initial set of budget allocations—for example, linear only, digital only, most efficient only, distribution based directly on media consumption profile and evaluates them first. It then, through combining and making small modifications to the best plans, evolves them towards a near-optimal plan in a small fraction of the time it might otherwise take. Thus, the techniques described herein can improve the speed and efficiency by which a media plan generation compute device (e.g., media plan generation compute device 1000) can generate a media plan(s), such as a media plan(s) including budget recommendations.

Some implementations thus provide an interactive approach that supplies a user in real or near real-time with media plans enhanced for such factors as budget, reach, lift and TRP using publicly available data accounting for users on populations of users, rather than limiting the analyses to monitorable user devices.

Figure 7A:
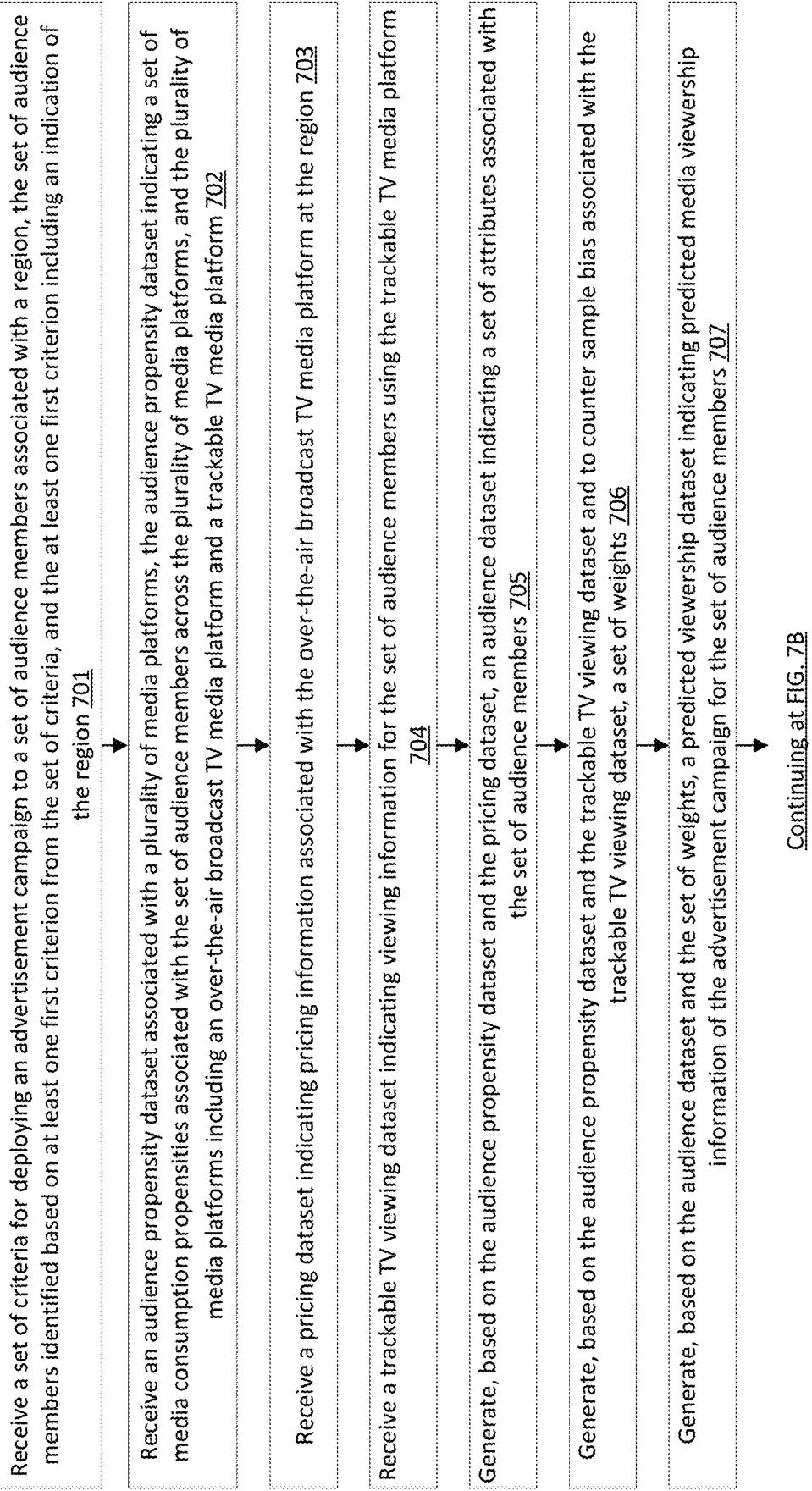

FIGS. 7A-7B show a flowchart of a method 700 for generating and causing display of a media plan, according to an embodiment. In some implementations, method 700 can be performed by a processor (e.g., processor 1001).

At 701, a set of criteria (e.g., set of criteria 1304) for deploying an advertisement campaign to a set of audience members associated with a region are received. The set of audience members can be identified based on at least one first criterion from the set of criteria, where the at least one first criterion includes an indication of the region.

At 702, an audience propensity dataset (e.g., audience propensity dataset 1203) associated with a plurality of media platforms is received. The audience propensity dataset can indicate a set of media consumption propensities associated with the set of audience members across the plurality of media platforms. The plurality of media platforms can include an over-the-air broadcast TV media platform (e.g., whose content that is displayed is not trackable) and a trackable TV media platform (e.g., whose content that is displayed is trackable). At 703, a pricing dataset (e.g., pricing dataset 1204) indicating pricing information associated with the over-the-air broadcast TV media platform at the region is received. At 704, a trackable TV viewing dataset (e.g., trackable TV viewing dataset 1205) indicating viewing information for the set of audience members using the trackable TV media platform is received. In some implementations, the order of 702-704 can be performed in any order and/or in parallel. For example, 704 and 703 can be performed in parallel and/or before 702.

At 705, an audience dataset (e.g. audience dataset 1003) indicating a set of attributes associated with the set of audience members is generated based on the audience propensity dataset and the pricing dataset. At 706, a set of weights (e.g., set of weights 1004) are generated to counter sample bias associated with the trackable TV viewing dataset based on the audience propensity dataset and the trackable TV viewing dataset. In some implementations 705 and 706 can be performed in any order and/or in parallel.

At 707, a predicted viewership dataset (e.g., predicted viewership dataset 1005) indicating predicted media viewership information of the advertisement campaign for the set of audience members is generated based on the audience dataset and the set of weights. In some implementations, 707 is performed automatically (e.g., without requiring additional user input) in response to completing 705 and 706.

At 708, a tier dataset (e.g., tier dataset 1006) is generated based on at least one of (1) the audience propensity dataset, (2) the predicted viewership dataset, (3) the trackable TV viewing dataset, or (4) a first digital campaign dataset previously collected from a first plurality of devices associated with at least one first media platform from the plurality of media platforms (e.g., digital campaign dataset 1007). For each media platform from the plurality of media platforms, the tier dataset can indicate a tier of media consumption for that media platform for each audience member from the set of audience members.

At 709, a cost dataset (e.g., cost dataset 1009) indicating a set of costs associated with deploying the advertisement campaign in accordance with at least one second criterion from the set of criteria can be generated based on a second digital campaign dataset (e.g., digital campaign dataset 1008) previously collected from a second plurality of devices associated with at least one second media platform from the plurality of media platforms.

At 710, a media plan (e.g., media plan 1010) for deploying the advertisement campaign to the set of audience members can be generated based on the predicted viewership dataset, the tier dataset for each media platform from the plurality of media platforms categories, and the cost dataset, the media plan including a set of budget recommendations for the plurality of media platforms. In some implementations, 710 can be performed automatically (e.g., without requiring additional user input) in response to completing 707, 708, and 709. In some implementations, the media plan can be generated using a fitness function.

At 711, a representation of the media plan can be caused to be display. Causing display can include, for example, sending an electronic signal to a compute device (e.g., user compute device 1300), the compute device configured to display the representation of the media plan (e.g., automatically) at a display (e.g., display 1302) in response to receiving the electronic signal.

In some implementations of method 700, the plurality of media platforms further includes at least one of a cable TV media platform, a mobile/desktop video media platform, or a social video media platform.

In some implementations of method 700, the set of costs includes a predicted minimum cost for deploying the advertisement campaign in accordance with the at least one second criterion, a predicted maximum cost for deploying the advertisement campaign in accordance with the at least one second criterion, and a predicted actual cost for deploying the advertisement campaign in accordance with the at least one second criterion.

In some implementations of method 700, the at least one second criterion includes an indication of a budget for deploying the advertisement campaign and a date range for which the advertisement campaign is to be deployed.

In some implementations of method 700, the set of attributes include at least one of an age, an income, an urbanicity, presence of children, an education level, a language preference, or a political party affiliation.

In some implementations of method 700, the media plan further includes indications of a reach of the advertisement campaign and a delivery estimate of the advertisement campaign.

In some implementations of method 700, the media plan is a first media plan and the set of budget recommendations is a first set of budget recommendations. Method 700 can further include generating a second media plan for the advertisement campaign based on the first media plan, the predicted viewership dataset, the tier dataset for each category from the plurality of categories, and the cost dataset, the second media plan including a second set of budget recommendations for the plurality of media platforms. Method 700 can further include causing display of a representation of the second media plan. Method 700 can further include generating a third media plan for the advertisement campaign based on the first media plan, the second media plan, the predicted viewership dataset, the tier dataset for each category from the plurality of categories, and the cost dataset, the third media plan including a third set of budget recommendations for the plurality of media platforms. Method 700 can further include causing display of a representation of the third media plan.

FIGS. 8A-8B show a flowchart of a method 800 for generating and causing display of a media plan, according to an embodiment. In some implementations, method 800 can be performed by a processor (e.g., processor 1001).

At 801, a set of criteria (e.g., set of criteria 1304) for deploying an advertisement campaign to a set of audience members associated with a region are received. The set of audience members can be identified based on at least one first criterion from the set of criteria. The at least one first criterion can include an indication of the region.

At 802, an audience propensity dataset (e.g., audience propensity dataset 1203) associated with a plurality of media platforms are received. The audience propensity dataset can indicate a set of media consumption propensities associated with the set of audience members across the plurality of media platforms. The media platforms can include a first set of media platforms and a second set of media platforms different than the first set of media platforms. Content output by the first set of media platforms can be monitorable by an organization, and content output by the second set of media platforms is not monitorable by the organization. At 803, a pricing dataset (e.g., pricing dataset 1204) indicating pricing information associated with the first set of media platforms at the region is received. At 804, a viewing dataset (e.g., trackable TV viewing dataset 1205) indicating viewing information for the set of audience members using the first set of media platform is received. In some implementations, the order of 802-804 can be performed in any order and/or in parallel. For example, 804 and 803 can be performed in parallel and/or before 802.

At 805, an audience dataset (e.g., audience dataset 1003) indicating a set of attributes associated with the set of audience members is generated based on the audience propensity dataset and the pricing dataset. At 806, a set of weights (e.g., set of weights 1004) are generated based on the audience propensity dataset and the viewing dataset to counter sample bias associated with the viewing dataset. In some implementations 805 and 806 can be performed in any order and/or in parallel.

At 807, a predicted viewership dataset (e.g., predicted viewership dataset 1005) indicating predicted media viewership information of the advertisement campaign for the set of audience members is generated based on the audience dataset and the set of weights. In some implementations, 807 is performed automatically (e.g., without requiring additional user input) in response to completing 805 and 806.

At 808, a media plan (e.g., media plan 1010) for deploying the advertisement campaign to the set of audience members is generated based on the predicted viewership dataset, a tier dataset (e.g., tier dataset 1006) indicating a tier of media consumption for each media platform from the set of media platforms for each audience member from the set of audience members, and a cost dataset (e.g., cost dataset 1009) indicating a set of costs associated with deploying the advertisement campaign in accordance with at least one second criterion from the set of criteria. The media plan can include a set of budget recommendations for the plurality of media platforms.

At 809, a representation of the media plan is caused to be displayed. Causing display can include, for example, sending an electronic signal to a compute device (e.g., user compute device 1300), the compute device configured to display the representation of the media plan (e.g., automatically) at a display (e.g., display 1302) in response to receiving the electronic signal.

In some implementations of method 800, the tier dataset was generated based on at least one of the audience propensity dataset, the predicted viewership dataset, the viewing dataset, or a first digital campaign dataset (e.g., digital campaign dataset 1007) previously collected from a first plurality of devices associated with at least one first media platform from the plurality of media platforms. In some implementations of method 800, the cost dataset was generated based on a second digital campaign dataset (e.g., digital campaign dataset 1008) previously collected from a second plurality of devices associated with at least one second media platform from the plurality of media platforms.

In some implementations of method 800, the at least one second criterion includes an indication of a goal from a predetermined set of goals, the predetermined set of goals including at least one of best reach, best reach to cost ratio, best lift with respect to a behavior of interest, best gross rating points, or best targeted rating points.

In some implementations of method 800, the set of attributes include age and gender.

In some implementations of method 800, the media plan further includes indications of a reach of the advertisement campaign.

In some implementations of method 800, the media plan is a first media plan and the set of budget recommendations is a first set of budget recommendations. Some implementations of method 800 further include generating a second media plan for the advertisement campaign based on the first media plan, the predicted viewership dataset, the tier dataset for each category from the plurality of categories, and the cost dataset. The second media plan can include a second set of budget recommendations for the plurality of media platforms. Some implementations of method 800 further include causing display of a representation of the second media plan.

FIG. 9 show a flowchart of a method 900 for generating and causing display of a media plan, according to an embodiment. In some implementations, method 900 can be performed by a processor (e.g., processor 1001).

At 901, a set of criteria (e.g., set of criteria 1304) for deploying an advertisement campaign to a set of audience members associated with a region are received. The set of audience members can be identified based on at least one first criterion from the set of criteria. The at least one first criterion can include an indication of the region.

At 902, an audience propensity dataset (e.g., audience propensity dataset 1203) associated with a plurality of media platforms are received. The audience propensity dataset can indicate a set of media consumption propensities associated with the set of audience members across the plurality of media platforms. The media platforms can include a first set of media platforms and a second set of media platforms. Content output by the first set of media platforms can be monitorable by an organization, and content output by the second set of media platforms can be not monitorable by the organization. At 903, a pricing dataset (e.g., pricing dataset 1204) indicating pricing information associated with the first set of media platforms at the region is received. At 904, a viewing dataset (e.g., trackable TV viewing dataset 1205) indicating viewing information for the set of audience members using the first set of media platforms is received. In some implementations, the order of 902-904 can be performed in any order and/or in parallel. For example, 904 and 903 can be performed in parallel and/or before 902.

At 905, a media plan (e.g., media plan 1010) for deploying the advertisement campaign to the set of audience members is generated based on (1) a predicted viewership dataset (e.g., predicted viewership dataset 1005) indicating predicted media viewership information of the advertisement campaign for the set of audience members, (2) a tier dataset (e.g., tier dataset 1006) indicating, for each media platform from the plurality of media platforms, a tier of media consumption for that media platform for each audience member from the set of audience members, and (3) a cost dataset (e.g., cost dataset 1009) indicating a set of costs associated with deploying the advertisement campaign in accordance with at least one second criterion from the set of criteria. The media plan can include a set of budget recommendations for the plurality of media platforms. The predicted viewership dataset can be generated based on (a) an audience dataset (e.g., audience dataset 1003) indicating a set of attributes associated with the set of audience members and generated based on the audience propensity dataset and the pricing dataset, and/or (b) a set of weights (e.g., set of weights 1004) generated based on the audience propensity dataset and the viewing dataset. The tier dataset can be generated based on at least one of the audience propensity dataset, the predicted viewership dataset, the viewing dataset, or a first digital campaign dataset (e.g., digital campaign dataset 1007) previously collected from a first plurality of devices associated with at least one first media platform from the plurality of media platforms. The cost dataset can be generated based on a second digital campaign dataset (e.g., digital campaign dataset 1008) previously collected from a second plurality of devices associated with at least one second media platform from the plurality of media platforms.

At 906, a representation of the media plan is caused to be displayed. Causing display can include, for example, sending an electronic signal to a compute device (e.g., user compute device 1300), the compute device configured to display the representation of the media plan (e.g., automatically) at a display (e.g., display 1302) in response to receiving the electronic signal.

In some implementations of method 900, the plurality of media platforms includes a broadcast TV media platform, a cable TV media platform, a mobile/desktop video media platform, and a social video media platform.

In some implementations of method 900, at least one second criterion includes an indication of a budget for deploying the advertisement campaign and a date range for which the advertisement campaign is to be deployed.

In some implementations of method 900, the set of attributes includes an age, a gender, an income, an education level, a language preference, and a political party affiliation.

In some implementations of method 900, the set of costs includes a predicted minimum cost for deploying the advertisement campaign in accordance with the at least one second criterion, a predicted maximum cost for deploying the advertisement campaign in accordance with the at least one second criterion, and a predicted actual cost for deploying the advertisement campaign in accordance with the at least one second criterion.

In some implementations of method 900, the media plan is a first media plan and the set of budget recommendations is a first set of budget recommendations. Some implementations of method 900 further include generating a second media plan for the advertisement campaign based on the first media plan, the predicted viewership dataset, the tier dataset for each category from the plurality of categories, and the cost dataset. The second media plan can include a second set of budget recommendations for the plurality of media platforms. Some implementations of method 900 further include causing display of a representation of the second media plan instead of the first media plan.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A);

in yet another embodiment, to at least one, optionally including more than one, A, and at least one, optionally including more than one, B (and optionally including other elements); etc.

In the embodiments, as well as in the specification above, all transitional phrases such as "comprising," "including,"

"carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:
   receiving, via a processor, a set of criteria for deploying an advertisement campaign to a set of audience members associated with a region, the set of audience members identified based on at least one first criterion from the set of criteria, and the at least one first criterion including an indication of the region;
   receiving, via the processor, an audience propensity dataset associated with a plurality of media platforms, the audience propensity dataset indicating a set of media consumption propensities associated with the set of audience members across the plurality of media platforms, and the plurality of media platforms including an over-the-air broadcast TV media platform and a trackable TV media platform;
   receiving, via the processor, a pricing dataset indicating pricing information associated with the over-the-air broadcast TV media platform at the region;
   receiving, via the processor, a trackable TV viewing dataset indicating viewing information for the set of audience members using the trackable TV media platform;
   generating, via the processor and based on the audience propensity dataset and the pricing dataset, an audience dataset indicating a set of attributes associated with the set of audience members;
   generating, via the processor, based on the audience propensity dataset and the trackable TV viewing dataset, and to counter sample bias associated with the trackable TV viewing dataset, a set of weights;
   generating, via the processor and based on the audience dataset and the set of weights, a predicted viewership dataset indicating predicted media viewership information of the advertisement campaign for the set of audience members;
   generating a tier dataset, via the processor, based on at least one of (1) the audience propensity dataset, (2) the predicted viewership dataset, (3) the trackable TV viewing dataset, or (4) a first digital campaign dataset previously collected from a first plurality of devices associated with at least one first media platform from the plurality of media platforms, and for each media platform from the plurality of media platforms, the tier dataset indicating a tier of media consumption for that media platform for each audience member from the set of audience members;
   generating, via the processor and based on a second digital campaign dataset previously collected from a second plurality of devices associated with at least one second media platform from the plurality of media platforms, a cost dataset indicating a set of costs associated with deploying the advertisement campaign in accordance with at least one second criterion from the set of criteria;
   generating, via the processor, a media plan for deploying the advertisement campaign to the set of audience members based on the predicted viewership dataset, the tier dataset for each media platform from the plurality of media platforms, and the cost dataset, the media plan including a set of budget recommendations for the plurality of media platforms; and
   causing, via the processor, display of a representation of the media plan.

2. The method of claim 1, wherein the plurality of media platforms further includes at least one of a cable TV media platform, a mobile/desktop video media platform, or a social video media platform.

3. The method of claim 1, wherein the set of costs includes a predicted minimum cost for deploying the advertisement campaign in accordance with the at least one second criterion, a predicted maximum cost for deploying the advertisement campaign in accordance with the at least one second criterion, and a predicted actual cost for deploying the advertisement campaign in accordance with the at least one second criterion.

4. The method of claim 1, wherein the at least one second criterion includes an indication of a budget for deploying the advertisement campaign and a date range for which the advertisement campaign is to be deployed.

5. The method of claim 1, wherein the set of attributes include at least one of an age, an income, an urbanicity, presence of children, an education level, a language preference, or a political party affiliation.

6. The method of claim 1, wherein the media plan further includes indications of a reach of the advertisement campaign and a delivery estimate of the advertisement campaign.

7. The method of claim 1, wherein the media plan is a first media plan and the set of budget recommendations is a first set of budget recommendations, the method further comprising:
generating, via the processor, a second media plan for the advertisement campaign based on the first media plan, the predicted viewership dataset, the tier dataset for each media platform from the plurality of media platforms, and the cost dataset, the second media plan including a second set of budget recommendations for the plurality of media platforms; and
causing, via the processor, display of a representation of the second media plan.

8. The method of claim 7, further comprising:
generating, via the processor, a third media plan for the advertisement campaign based on the first media plan, the second media plan, the predicted viewership dataset, the tier dataset for each media platform from the plurality of media platforms, and the cost dataset, the third media plan including a third set of budget recommendations for the plurality of media platforms; and
causing, via the processor, display of a representation of the third media plan.

9. An apparatus, comprising:
a memory; and
a processor operatively coupled to the memory, the processor configured to:
receive a set of criteria for deploying an advertisement campaign to a set of audience members associated with a region, the set of audience members identified based on at least one first criterion from the set of criteria, and the at least one first criterion including an indication of the region;
receive an audience propensity dataset associated with a plurality of media platforms, the audience propensity dataset indicating a set of media consumption propensities associated with the set of audience members across the plurality of media platforms, and the plurality of media platforms including an over-the-air broadcast TV media platform and a trackable TV media platform;
receive a pricing dataset indicating pricing information associated with the over-the-air broadcast TV media platform at the region;
receive a trackable TV viewing dataset indicating viewing information for the set of audience members using the trackable TV media platform;
generate, based on the audience propensity dataset and the pricing dataset, an audience dataset indicating a set of attributes associated with the set of audience members;
generate a set of weights (1) based on the audience propensity dataset and the trackable TV viewing dataset and (2) to counter sample bias associated with the trackable TV viewing dataset;
generate, based on the audience dataset and the set of weights, a predicted viewership dataset indicating predicted media viewership information of the advertisement campaign for the set of audience members;
generate a tier dataset based on at least one of (1) the audience propensity dataset, (2) the predicted viewership dataset, (3) the trackable TV viewing dataset, or (4) a first digital campaign dataset previously collected from a first plurality of devices associated with at least one first media platform from the plurality of media platforms, and
for each media platform from the plurality of media platforms, the tier dataset indicating a tier of media consumption for that media platform for each audience member from the set of audience members;
generate, based on a second digital campaign dataset previously collected from a second plurality of devices associated with at least one second media platform from the plurality of media platforms, a cost dataset indicating a set of costs associated with deploying the advertisement campaign in accordance with at least one second criterion from the set of criteria;
generate a media plan for deploying the advertisement campaign to the set of audience members based on the predicted viewership dataset, the tier dataset for each media platform from the plurality of media platforms categories, and the cost dataset.

10. The apparatus of claim 9, wherein the plurality of media platforms further includes at least one of a cable TV media platform, a mobile/desktop video media platform, or a social video media platform.

11. The apparatus of claim 9, wherein the set of costs includes a predicted minimum cost for deploying the advertisement campaign in accordance with the at least one second criterion, a predicted maximum cost for deploying the advertisement campaign in accordance with the at least one second criterion, and a predicted actual cost for deploying the advertisement campaign in accordance with the at least one second criterion.

12. The apparatus of claim 9, wherein the at least one second criterion includes an indication of a budget for deploying the advertisement campaign and a date range for which the advertisement campaign is to be deployed.

13. The apparatus of claim 9, wherein the set of attributes include at least one of an age, an income, an urbanicity, presence of children, an education level, a language preference, or a political party affiliation.

14. The apparatus of claim 9, wherein the media plan further includes indications of a reach of the advertisement campaign and a delivery estimate of the advertisement campaign.

15. A non-transitory processor-readable medium storing code representing instructions to be executed by one or more processors, the instructions comprising code to cause the one or more processors to:
receive a set of criteria for deploying an advertisement campaign to a set of audience members associated with a region, the set of audience members identified based on at least one first criterion from the set of criteria, and the at least one first criterion including an indication of the region;

receive an audience propensity dataset associated with a plurality of media platforms, the plurality of media platforms including a trackable TV media platform;

receive a trackable TV viewing dataset indicating viewing information for the set of audience members using the trackable TV media platform;

generate, based on the audience propensity dataset, an audience dataset indicating a set of attributes associated with the set of audience members;

generate a set of weights (1) based on the audience propensity dataset and the trackable TV viewing dataset and (2) to counter sample bias associated with the trackable TV viewing dataset;

generate, based on at least one of the audience dataset and the set of weights, a predicted viewership dataset indicating predicted media viewership information of the advertisement campaign for the set of audience members;

generate a tier dataset based on at least one of (1) the audience propensity dataset, (2) the predicted viewership dataset, (3) the trackable TV viewing dataset, or (4) a first digital campaign dataset previously collected from a first plurality of devices associated with at least one first media platform from the plurality of media platforms, and for each media platform from the plurality of media platforms, the tier dataset indicating a tier of media consumption for that media platform for each audience member from the set of audience members;

generate, based on a second digital campaign dataset previously collected from a second plurality of devices associated with at least one second media platform from the plurality of media platforms, a cost dataset indicating a set of costs associated with deploying the advertisement campaign in accordance with at least one second criterion from the set of criteria;

generate a media plan for deploying the advertisement campaign to the set of audience members based on the predicted viewership dataset, the tier dataset for each media platform from the plurality of media platforms categories, and the cost dataset, the media plan including a set of budget recommendations for the plurality of media platforms; and cause display of a representation of the media plan.

16. The non-transitory processor-readable medium of claim 15, wherein the plurality of media platforms further includes at least one of a cable TV media platform, a mobile/desktop video media platform, or a social video media platform.

17. The non-transitory processor-readable medium of claim 15, wherein the set of costs includes a predicted minimum cost for deploying the advertisement campaign in accordance with the at least one second criterion, a predicted maximum cost for deploying the advertisement campaign in accordance with the at least one second criterion, and a predicted actual cost for deploying the advertisement campaign in accordance with the at least one second criterion.

18. The non-transitory processor-readable medium of claim 15, wherein the at least one second criterion includes an indication of a budget for deploying the advertisement campaign and a date range for which the advertisement campaign is to be deployed.

19. The non-transitory processor-readable medium of claim 15, wherein the media plan is a first media plan and the set of budget recommendations is a first set of budget recommendations, and the code further comprises code to cause the one or more processors to:

generate a second media plan for the advertisement campaign based on the first media plan, the predicted viewership dataset, the tier dataset for each media platform from the plurality of media platforms, and the cost dataset, the second media plan including a second set of budget recommendations for the plurality of media platforms; and cause display of a representation of the second media plan.

20. The non-transitory processor-readable medium of claim 19, wherein the code further comprises code to cause the one or more processors to:

generate a third media plan for the advertisement campaign based on the first media plan, the second media plan, the predicted viewership dataset, the tier dataset for each media platform from the plurality of media platforms, and the cost dataset, the third media plan including a third set of budget recommendations for the plurality of media platforms; and cause display of a representation of the third media plan.

* * * * *